United States Patent
Dugger

(10) Patent No.: US 7,263,464 B1
(45) Date of Patent: Aug. 28, 2007

(54) SYSTEM AND METHOD FOR MONITORING EVENTS IN A COMPUTING ENVIRONMENT

(75) Inventor: Jim Dugger, Dallas, TX (US)

(73) Assignee: Tonic Software, Inc., Lindon, UT (US)

( * ) Notice: Subject to any disclaimer, the term of this patent is extended or adjusted under 35 U.S.C. 154(b) by 23 days.

(21) Appl. No.: 10/927,902

(22) Filed: Aug. 27, 2004

(51) Int. Cl.
 G06F 11/30 (2006.01)
 G06F 15/173 (2006.01)

(52) U.S. Cl. ...................... 702/182; 709/224

(58) Field of Classification Search ........... 702/182; 709/224, 231, 223; 714/47; 707/10, 100, 707/104.1; 719/318; 708/300; 700/55
See application file for complete search history.

(56) References Cited

U.S. PATENT DOCUMENTS

| | | | |
|---|---|---|---|
| 5,944,839 A | 8/1999 | Isenberg | |
| 6,138,121 A * | 10/2000 | Costa et al. | 707/100 |
| 6,237,114 B1 | 5/2001 | Wookey et al. | |
| 6,446,136 B1 * | 9/2002 | Pohlmann et al. | 719/318 |
| 6,484,203 B1 * | 11/2002 | Porras et al. | 709/224 |
| 6,594,774 B1 | 7/2003 | Chapman et al. | |
| 6,618,820 B1 | 9/2003 | Krum | |
| 6,629,106 B1 * | 9/2003 | Narayanaswamy et al. | 707/104.1 |
| 6,671,818 B1 | 12/2003 | Mikurak | |
| 6,678,639 B2 | 1/2004 | Little et al. | |
| 6,714,979 B1 | 3/2004 | Brandt et al. | |
| 6,898,261 B1 * | 5/2005 | Hunter et al. | 377/15 |
| 6,947,984 B2 * | 9/2005 | Schweitzer et al. | 709/224 |
| 6,963,983 B2 * | 11/2005 | Munson et al. | 726/5 |
| 2004/0201612 A1 * | 10/2004 | Hild et al. | 345/736 |
| 2005/0234920 A1 * | 10/2005 | Rhodes | 707/10 |

OTHER PUBLICATIONS

Wolfson et al., Managing Communication Networks by Monitoring Databases, Sep. 1991, IEEE Transactions on Software Engineering, vol. 17, No. 9, pp. 944-953.*
Yemini et al., High Speed and Robust Event Correlation, May 1996, IEEE Communications Magazine, pp. 82-90.*
Ma et al., EventMiner: An Integrated Mining Tool for Scalable Analysis of Event Data, May 21, 2001, pp. 1-17.*
Buckley et al., VAX/VMS Event Monitoring and Analysis, 1995 IEEE, pp. 414-423.*

\* cited by examiner

*Primary Examiner*—Donald E. McElheny, Jr.
*Assistant Examiner*—Toan M. Le
(74) *Attorney, Agent, or Firm*—AdvantEdge Law Group, LLC

(57) ABSTRACT

A method for monitoring a facility including a plurality of computer systems is disclosed. The method includes receiving an event stream from the plurality of computer systems, assigning a numerical value to each of the plural events to produce a real-time operation numerical event stream, and comparing the real-time operation numerical event stream to a previously collected normal operation numerical event stream. The event stream includes plural events provided during real-time operation.

22 Claims, 4 Drawing Sheets

SYSTEM AND METHOD FOR MONITORING EVENTS IN A COMPUTING ENVIRONMENT

BACKGROUND

1. Field of the Disclosure

The present disclosure relates to computing centers and methods for monitoring events received by one or more servers in the computing center.

2. Description of the Related Art

A significant portion of corporate information in the United States and abroad resides in computing centers. These computing centers can include numerous servers that handle the access to databases in which the information is stored. Each database can be a collection of information organized for use by a computer or each database can be a computer system which is a source of real time data and stored data. A large database center can have an inordinate number of individual servers in order to handle the event traffic to and from the numerous databases connected thereto. In order to maintain the availability of information housed in a database center, the systems that handle the information, e.g., the servers, the applications, databases, etc., must be monitored and managed.

Currently, there are different types of software that exist for providing various levels and approaches to managing database centers. Much of the software includes providing numerous alerts when certain errors in the database center are detected. For small database centers, these alerts offer value for the operator in terms of early notification of problems and pending issues. However, for large database centers, these alerts and associated events can be quite frequent and disruptive. Additionally, manual monitoring a database center offers no basis for recording and analyzing normal operations for comparisons over time. As such, there is a need for an improved system and method for monitoring events in a computing environment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

A method for monitoring a facility including a plurality of computer systems is disclosed. The method includes receiving an event stream from the plurality of computer systems, assigning a numerical value to each of the plural events to produce a real time operation numerical event stream, and comparing the real time operation numerical event stream to a previously collected normal operation numerical event stream. The event stream includes plural events provided during real-time operation.

Figure 1:
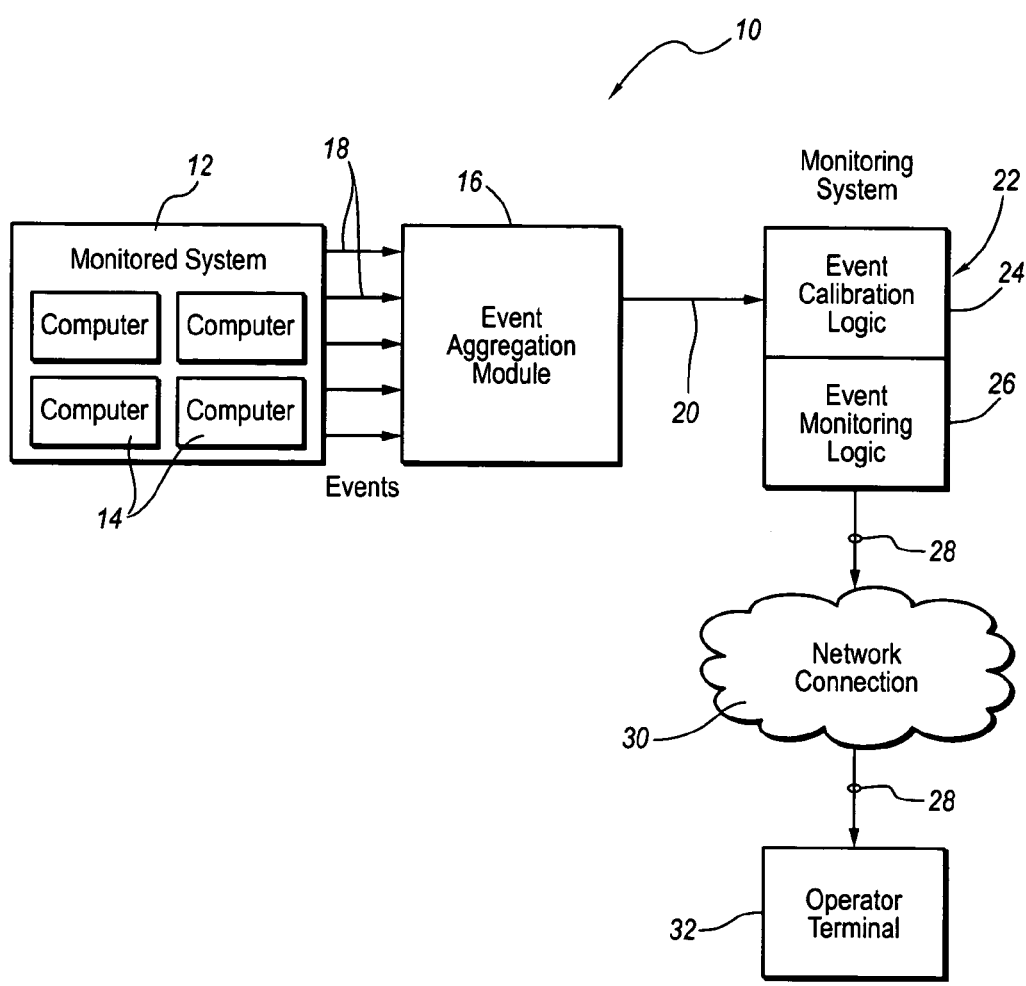
FIG. 1 is a block diagram of an exemplary computer system.

Referring now to FIG. 1, a non-limiting, exemplary embodiment of a computer system is illustrated and is generally designated 10. As depicted in FIG. 1, the computer system 10 includes a monitored system 12 that includes plural computers 14. In a particular embodiment, the computer system 10 is a computing center facility that includes plural servers configured to handle traffic to and from plural databases. FIG. 1 indicates that the monitored system 12 can be connected to an event aggregation module 16. Accordingly, plural received events 18 can be transmitted from the monitored system 12 to the event aggregation module 16. The event aggregation module 16 can aggregate the plural events 18 to produce an event stream 20. Specifically, the event aggregation module 16 can sort the events 18 from the monitored system 12 and remove any unwanted events as defined by a user. The event stream 20 can be transmitted from the event aggregation module 16 to a monitoring system 22.

As illustrated in FIG. 1, the monitoring system 22 can include event calibration logic 24 and event monitoring logic 26. As described in detail below in conjunction with FIG. 3 and FIG. 4, a user can initially calibrate settings for the monitoring system 22 and then monitor the monitored system 12 to ensure proper operation. Details of the various components of the monitoring system 22 are described in conjunction with FIG. 2, below. FIG. 1 further indicates that the monitoring system 22 can send an output 28 to an operator terminal 32, e.g., via a network connection 30. It can be appreciated that the network connection 30 can be established via a local area network (LAN) connection, a wide area network connection (WAN), a wireless Internet connection, a digital subscriber line (DSL), a cable connection, or other network connection. Further, it can be appreciated that the operator terminal 32 can be a dummy terminal, a computer, a portable data assistant (PDA), or any other similar device.

Figure 2:
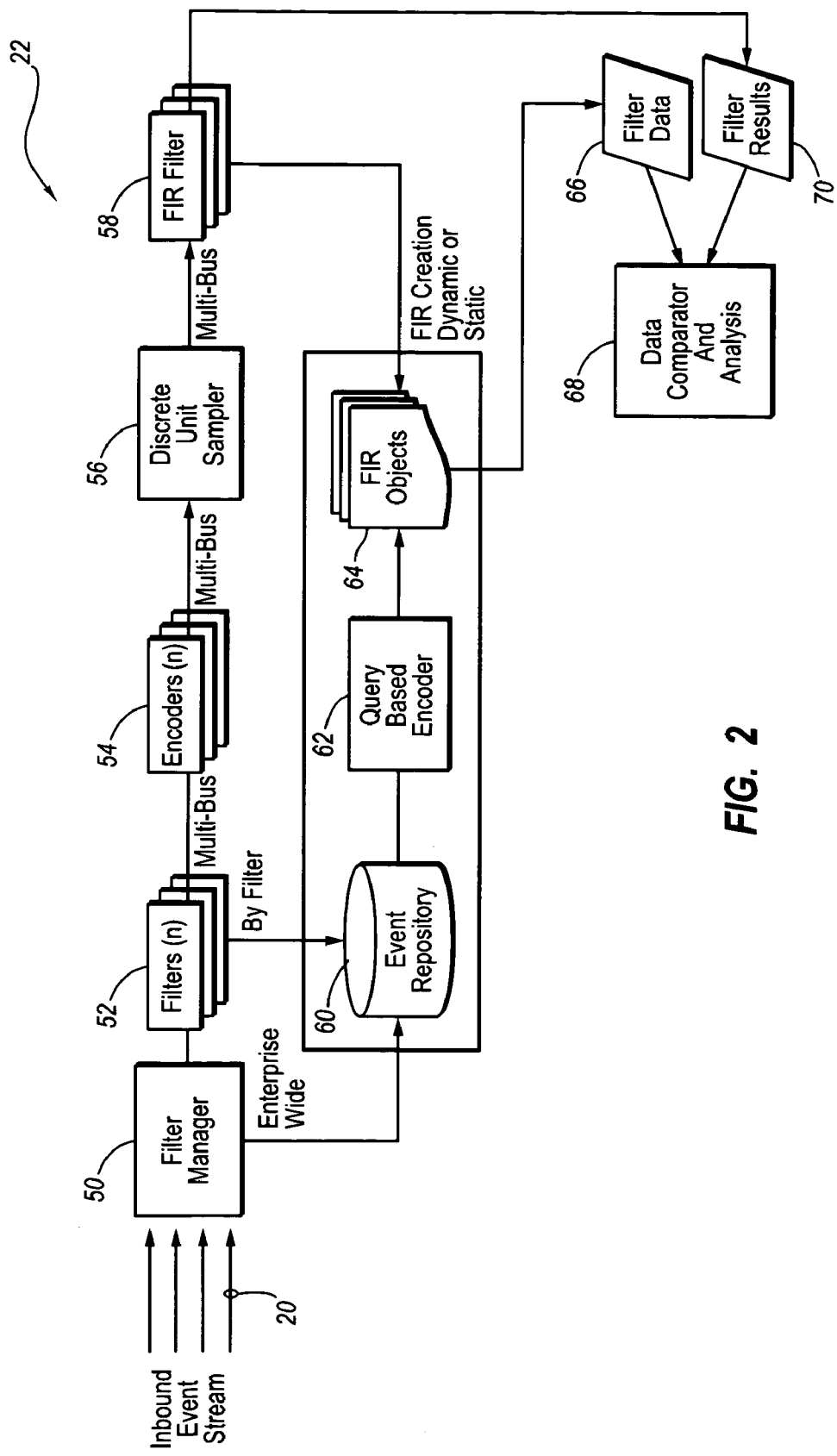
FIG. 2 is a block diagram of an event monitoring system.

Referring now to FIG. 2, details concerning a particular embodiment of the monitoring system 22 are shown. As shown, the monitoring system 22 includes a filter manager 50 to which the event stream 20 is input. The filter manager 50 can allow a user to define one or more event filters 52 for sorting desired events in a given application into pre-defined classifications. The event can be an alert, a status signal, or a particular request. For example, the user can monitor the availability of a shopping cart implementation in a relatively large e-commerce server environment. In this example, the filter manager 50 would allow the user to create a model in which only alerts from the systems related to the shopping cart servers would pass through this event filter 52.

FIG. 2 further illustrates plural encoders 54 that receive filtered events from the event filters 52. The encoders 54 process the filtered events and assign each filtered event in each classification with an integer value. In one embodiment, the encoders can allocate integer values to the filtered events based on degrees of severity defined by a user. If an event is a simple status report, e.g., CPU utilization, the metric value for that event can be used directly. Thus, the encoders 54 create a numerical event stream that may be sent to a discrete unit sampler 56.

In one embodiment, the discrete unit sampler 56 quantizes the inbound numerical event stream into time segments and when events are unavailable, the discrete unit sampler 56 inserts zero into the queue for processing. The discrete unit sampler 56 can process large quantities of events off-line as if they were received in real time. As such, large quantities of data can be processed in a streamlined, single-threaded fashion. In a non-limiting, exemplary embodiment the inbound numerical event stream may already be discrete and the need to quantize the inbound numerical stream is obviated. For example, event data resulting in a performanceby-curve method returned from a run-time profile of a computing process or transaction is discrete and does not need to be quantized.

From the discrete unit sampler 56 the numerical event stream is sent to finite impulse response (FIR) filters 58. The FIR filters 58 can perform a convolution process, e.g., a discrete time convolution process, on the numerical event stream created in part by the encoders 54 and the discrete unit sampler 56. After reading the specification, skilled artisans will appreciate that the numerical event stream is a representation correlated to the actual events received by the monitoring system 22. In an exemplary, non-limiting embodiment, the FIR filters 58 include data related to a normal operation numerical event stream that was previously collected during a calibration phase and stored in an event repository 60. The calibration logic for the calibration phase is described below in conjunction with FIG. 3.

As depicted in FIG. 2, the event repository 60 can be accessed via a query based encoder 62, which, in turn, can access plural FIR objects 64. The query based encoder 62 includes a process that used a database query to return a series of stored real-time events on any collection of systems within a selected window of recorded history. This data can be encoded, e.g., in the same manner that real-time data that is encoded by the discrete unit sampler, and then, supplied to the FIR filters 58 as a baseline or coefficient set for the convolution processed performed therein. In an exemplary, non-limiting embodiment, the FIR filters 58 can retrieve a filter configuration created by the query based encoder 62 for use in the convolution process performed by the FIR filters 58.

The FIR objects 64 can output filter data 66 to a data comparator 68. At the data comparator 68, the filter data 66 can be compared to filter results 70 from one or more of the FIR filters 58. Specifically, a "real time" filtered numerical event stream produced from the discrete unit sampler 56 can be compared to the normal operation calibrated numerical event stream to determine how far from normal the monitored system 12 (FIG. 1) is presently operating. The comparison can be based on a root mean square (RMS) operation or it can be based on use of a statistical process.

In one embodiment, each FIR filter 58 can have a sampling rate and sampling size defined by an internal evaluation algorithm that can examine the typical event input load during the known period of normal operation. Thus, a user of the operator terminal 32 or the monitored system 12 can be isolated from the technical details of the detailed event monitoring and comparison logic, such as the FIR filters 58, the convolution process, and sampling rates, but the user can learn in real-time how close or far the monitored system is from the calibrated normal operation range. This indication of normalcy provides a useful metric for monitoring complex systems.

Figure 3:
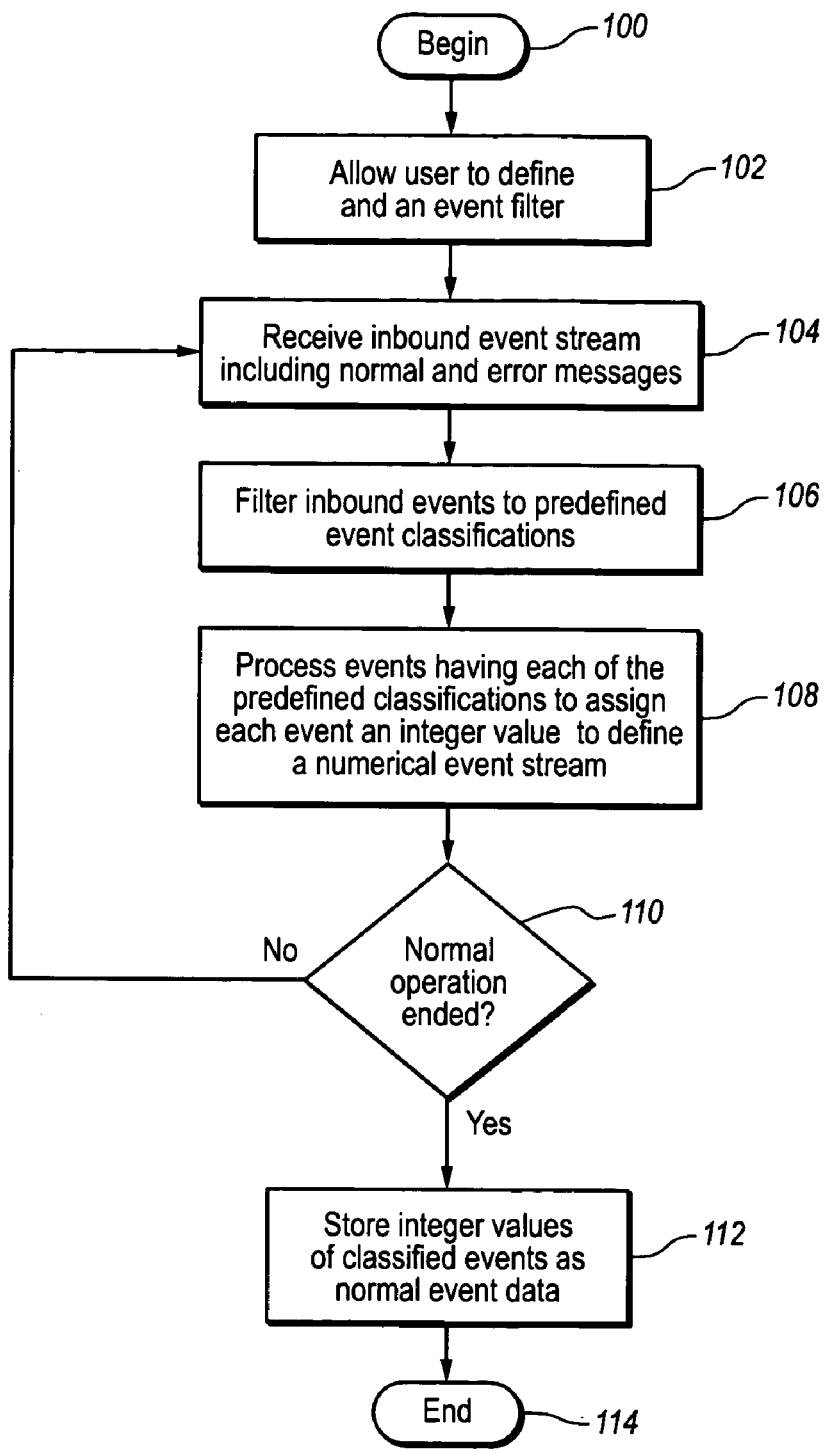
FIG. 3 is a flow chart to illustrate calibration logic of an embodiment of an event monitoring system.

FIG. 3 illustrates non-limiting, exemplary calibration logic of an embodiment of an event monitoring system. The calibration logic commences at block 100 with a loop, wherein during a known period of normal operation, the followings steps are performed: At block 102, a user is allowed to define an event filter, i.e., the user is allowed to define one or more event filters 52 (FIG. 2) for sorting desired events in a given application into pre-defined classifications. The event can be an alert, status signal, a particular request, a response to a particular button being toggled at a remote user computer, etc. Moving to block 104, an inbound event stream is received, e.g., at the monitoring system 22 (FIG. 2). The inbound event stream can include normal and error messages. At block 106, the inbound events are filtered to pre-defined event classifications. Next, at block 108, the events having each of the predefined classifications are processed in order to assign each event an integer value. As such, a numerical event stream is defined.

Proceeding to decision step 110, it is determined whether normal operation has ended. If not, the logic returns to block 104 and continues as described above. If normal operation has ended, the logic moves to block 112, where the integer values of classified events, i.e., the numerical event stream, is stored as normal event data. The user provides an input for the system to determine when to end sampling of calibration data during the normal operation calibration phase. In one embodiment, the normal event data can be a normal operation numerical event stream. The calibration logic then ends, at state 114.

Figure 4:
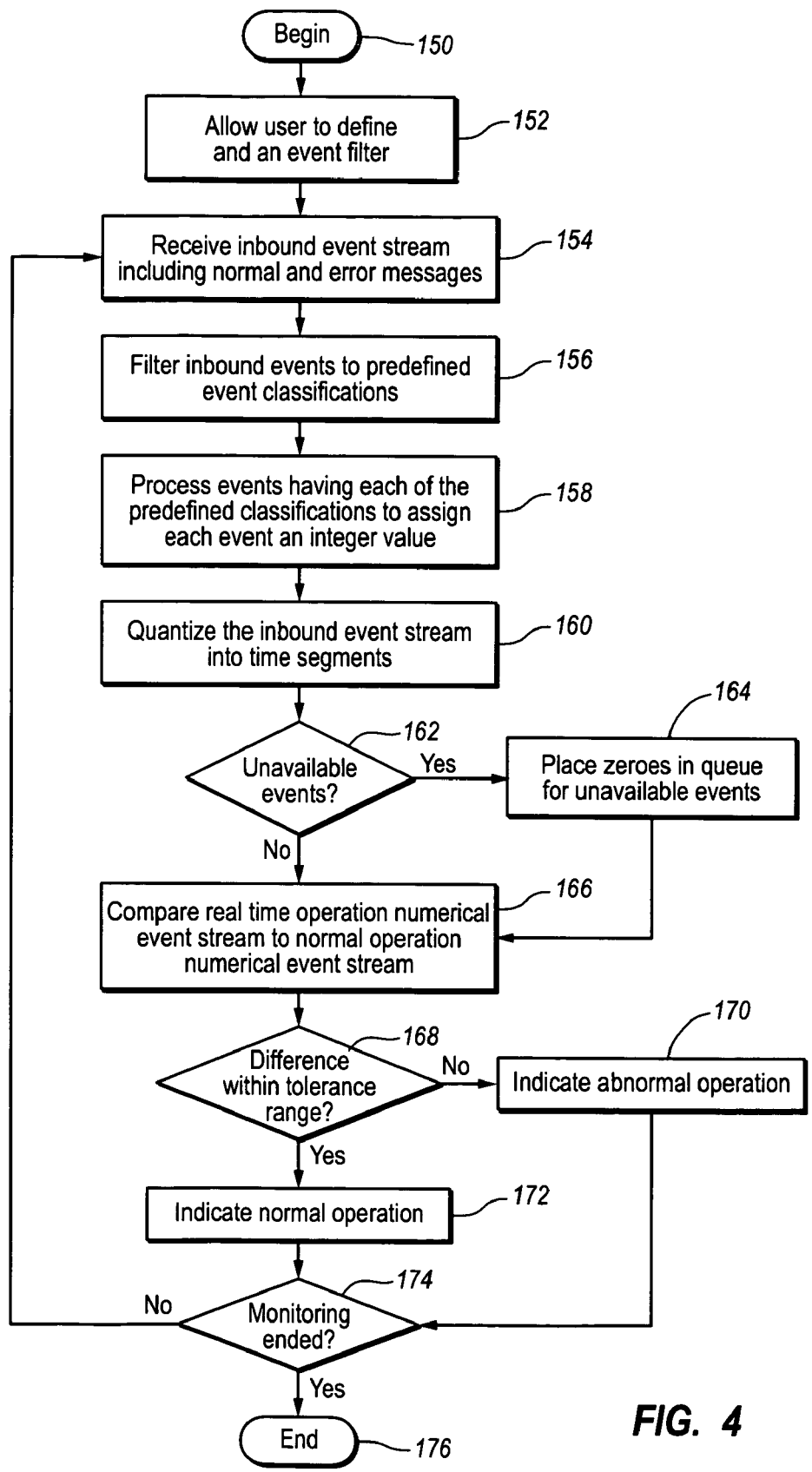
FIG. 4 is a flow chart to illustrate operation logic of an embodiment of an event monitoring system.

FIG. 4 is a flow chart to illustrate operation logic of an embodiment of an event monitoring system. The operation commences at block 150 with a loop, wherein during monitored operation, the followings steps are performed. At block 152, a user is allowed to define an event filter, i.e., the user is allowed to define one or more event filters 52 (FIG. 2) for sorting desired events in a given application into pre-defined classifications. As stated above, the event can be an alert, status signal, a particular request, a response to a particular button being toggled at a remote user computer, etc. Moving to block 154, an inbound event stream is received, e.g., at the monitoring system 22 (FIG. 2). The inbound event stream can include normal and error messages. At block 156, the inbound events are filtered to pre-defined event classifications. Next, at block 158, the events having each of the predefined classifications are processed in order to assign each event an integer value. As such, a numerical event stream of the monitored system is created.

Continuing to block 160, the inbound event stream is quantized into time segments. As stated above during the discussion of FIG. 2, the action of quantizing the inbound event stream may not be necessary, e.g., if the event stream includes data that is already discrete. Next, at decision step 162, it is determined whether there are any unavailable events. If so, the logic moves to block 164 and zeroes are placed in the event stream queue for unavailable events. Otherwise, the logic moves to block 166, where a real time operation numerical event stream is compared to a calibration of a normal operation numerical event stream. Next, at decision step 168 it is determined whether a difference between the real time operation numerical event stream and the normal operation numerical event stream is within a predefined tolerance range. If not, the logic moves to block 170 and abnormal operation is indicated. If so, normal operation is indicated at block 172.

From block 170 or block 172, the logic continues to decision step 174 where it is determined whether the period of monitoring has ended. If the monitoring has not ended the logic returns to block 154 and continues as described above. If the monitoring has ended, the logic ends at state 176.

The present system and method provides a relatively user friendly method of monitoring a computing center. A user can simply record a numerical representation of the events received or sent by one or more servers in a center during a known period of normal operation as a normal operation numerical event stream. Thereafter, at any period during operation, the center can be monitored by tracking real time events and converting those events to a numerical representation, i.e., the real time operation numerical event stream. The real time operation numerical event stream can be created using the same user defined parameters that are used while recording the normal operation numerical event stream. Accordingly, the real time operation numerical event stream can be compared to the normal operation numerical event stream to determine if the servers within the data base system are operating within acceptable limits.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for monitoring a facility including a plurality of computer systems, the method comprising:
   receiving an event stream from the plurality of computer systems, the event stream including plural events provided during real-time operation;
   assigning a numerical value to each of the plural events to produce a real-time operation numerical event stream;
   filtering the real-time operation numerical event stream with a FIR filter to produce a first FIR filtered event stream; and
   comparing the first FIR filtered event stream to a second FIR filtered event stream corresponding to event data previously collected during normal operation to produce comparison data indicating how far from normal the plurality of computers systems are operating.

2. The method of claim 1, further comprising:
   allowing a user to define an event filter to track selected types of events of interest.

3. The method of claim 2, further comprising:
   filtering events with respect to predefined event classifications.

4. The method of claim 3, further comprising:
   processing events having the predefined event classifications and assigning such collected events an integer value; and
   storing the integer values for the processed and collected events as the normal operation numerical event stream.

5. The method of claim 1, further comprising:
   using a sequence of stored events as FIR filter coefficients.

6. The method of claim 5, further comprising:
   quantizing the filtered event stream into time segments; and
   assigning zero values into time segments when there are no monitored events.

7. The method of claim 6, further comprising:
   based on the comparison between the first FIR filtered event stream and the second FIR filtered event stream, indicating normal operation or abnormal operation.

8. The method of claim 1, further comprising:
   during a known period of normal operation, collecting the normal operation event stream from one or more computer systems; and
   allowing a user to define an event filter to track collected events of interest.

9. The method of claim 8, further comprising:
   filtering the collected events with respect to predefined event classifications.

10. A method for monitoring a facility including a plurality of computer systems, the method comprising:
    during a calibration period of normal operation, receiving an event stream from one or more computer systems;
    converting the event stream into a normal operation numerical event stream by assigning one or more numerical values to each of the collected events based on predetermined weighted classifications;
    during a real time operation period, receiving a real time operation event stream from one or more computer systems;
    converting the real time operation event stream into a real time operation numerical event stream by assigning one or more numerical values to each event in the real time operation event stream based on predetermined weighted classifications;
    filtering the real time operation numerical event stream with a FIR filter to produce a first FIR filtered event stream;
    comparing the first FIR filtered event stream to a second FIR filtered event stream produced from the normal operation numerical event stream; and
    indicating normal operation of the facility when the comparison of the first FIR filtered event stream and the second FIR filtered event stream produced from the normal operation numerical event stream does not exceed a predetermined range.

11. The method of claim 10, further comprising:
    allowing a user to define an event filter to track events of interest.

12. The method of claim 11, further comprising:
    filtering events with respect to predefined event classifications.

13. The method of claim 10, further comprising:
    using a sequence of stored events as FIR filter coefficients.

14. The method of claim 13, further comprising:
    quantizing the filtered event stream into time segments; and
    assigning zero values into time segment for unavailable events.

15. A facility monitoring system comprising:
    a monitored system comprising plural computers;
    an event aggregation module responsive to the monitored system, the event aggregation module to receive plural events from the monitored system and to output an event stream;
    a monitoring system responsive to the event aggregation module, the monitoring system to receive the event stream from the event aggregation module, the monitoring system including event calibration logic and event monitoring logic for monitoring the monitored system;
    wherein the event calibration logic, during a calibration period of normal operation, receives a normal operation event stream from the monitored system and converts the normal operation event stream into a normal operation numerical event stream by assigning one or more numerical values to each event within the normal operation event stream based on predetermined weighted classifications; and wherein the event monitoring logic, during real time operation, receives a real time operation event stream from the monitored system, and converts the real time operation event stream into a real time operation numerical event stream by assigning one or more numerical values to each of the events in the real time operation event stream based on predetermined weighted classifications;
    filtering the real time operation event stream with a FIR filter to produce a first FIR filtered event stream; and
    wherein the first FIR filtered event stream is compared with a second FIR filtered event stream produced from the normal operation numerical stream for determining whether the monitored system is operating within a predefined acceptable range.

16. The system of claim 15, wherein the event monitoring logic comprises a computer program that allows a user to define an event filter to track events of interest.

17. The system of claim 16, wherein the computer program filters events with respect to predefined event classifications.

18. The system of claim 15, wherein the computer program processes events using a sequence of stored events as coefficients for the FIR filter.

19. The system of claim 18, wherein the computer program quantizes the filtered event stream into time segments, and assigns zero values for unavailable events.

20. The system of claim 19, wherein the monitoring system includes a network output that indicates normal operation or abnormal operation to a remote operator terminal, via a network connection.

21. The system of claim 15, wherein the comparison between the first FIR filtered event stream and the second FIR filtered event stream is performed based on a root mean square operation.

22. An event monitoring system comprising:
a monitored system comprising plural computers;
an event aggregation module responsive to the monitored system, the event aggregation module to receive plural events from the monitored system and to output an event stream;
a monitoring system responsive to the event aggregation module, the monitoring system to receive the event stream from the event aggregation module, the monitoring system including event calibration logic and event monitoring logic for monitoring the monitored system;
wherein the event calibration logic, during a calibration period of normal operation, receives a normal operation event stream from the monitored system and converts the normal operation event stream into a normal operation numerical event stream by assigning one or more numerical values to each event within the normal operation event stream based on predetermined weighted classifications;
the event monitoring logic, during real time operation, receives a real time operation event stream from the monitored system, and converts the real time operation event stream into a real time operation numerical event stream by assigning one or more numerical values to each of the events in the real time operation event stream based on predetermined weighted classifications; and
the real time operation numerical event stream is compared with the normal operation numerical stream using a root mean square operation for determining whether the monitored system is operating within a predefined acceptable range.

* * * * *